(12) United States Patent
Yang (10) Patent No.: US 9,416,934 B2
(45) Date of Patent: Aug. 16, 2016

(54) LIGHT SOURCE MODULE OF LAMP FOR VEHICLE

(71) Applicant: Hyundai Motor Company, Seoul (KR)

(72) Inventor: Jeong Gyu Yang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 14/289,053

(22) Filed: May 28, 2014

(65) Prior Publication Data

US 2015/0167918 A1 Jun. 18, 2015

(30) Foreign Application Priority Data

Dec. 18, 2013 (KR) .................. 10-2013-0158791

(51) Int. Cl.
*G02B 27/22* (2006.01)
*F21S 8/10* (2006.01)
*B60Q 1/26* (2006.01)

(52) U.S. Cl.
CPC ............. *F21S 48/215* (2013.01); *F21S 48/212* (2013.01); *F21S 48/238* (2013.01); *G02B 27/2221* (2013.01); *B60Q 1/26* (2013.01)

(58) Field of Classification Search
CPC .... B60Q 1/2619; F21S 48/212; F21S 48/215; F21S 48/238; G02B 27/2221
USPC .......................................... 362/516
See application file for complete search history.

(56) References Cited

U.S. PATENT DOCUMENTS

2013/0328090 A1* 12/2013 Park ..................... H01L 33/60
   257/98
2014/0055835 A1* 2/2014 Shinkai ..................... F21V 7/00
   359/251

FOREIGN PATENT DOCUMENTS

| JP | 2007-250290 A | 9/2007 |
| JP | 2011-187331 A | 9/2011 |
| KR | 1992-0014658 A | 8/1992 |
| KR | 100803310 B1 | 2/2008 |
| KR | 1020100131364 A | 12/2010 |
| KR | 10-2012-0041589 A | 5/2012 |
| KR | 20-0467628 Y1 | 7/2013 |
| KR | 10-2013-0107797 A | 10/2013 |

* cited by examiner

*Primary Examiner* — Sharon Payne
(74) *Attorney, Agent, or Firm* — Morgan, Lewis & Bockius LLP (57) ABSTRACT

Disclosed is a light source module for a vehicle. The light source module includes an LED light source, a PCB that controls supply of current to the LED light source, a patterned film disposed on the PCB and provided with an optical pattern which enables a stereoscopic light-emission image of a desired pattern to be formed when light from the LED light source is emitted thereto, and optical resin that is disposed on the patterned film and uniformly transmits the light from the LED light source to the entire range of the patterned film. The light source module improves visibility of the LED light source and makes a lamp using the light source module look luxurious by using a hidden effect of a deposited film even when the LED light source is not turned on.

9 Claims, 9 Drawing Sheets

LIGHT SOURCE MODULE OF LAMP FOR VEHICLE

CROSS REFERENCE TO RELATED APPLICATION

The present application claims priority to Korean Patent Application No. 10-2013-0158791 filed on Dec. 18, 2013, the entire contents of which is incorporated herein for all purposes by this reference.

BACKGROUND OF THE INVENTION

1. Field of the Invention

The present invention relates to a light source module of a lamp for a vehicle, and more particularly to a light source module which makes up a rear combination lamp.

2. Description of the Related Art

The term "rear combination lamp" for a vehicle represents lamps mounted at the back of a vehicle, for example, including a back up lamp which is turned on when the transmission is shifted to reverse gear, a stop lamp which is turned on when a driver steps down a brake pedal, and a turn signal lamp.

Figure 1:
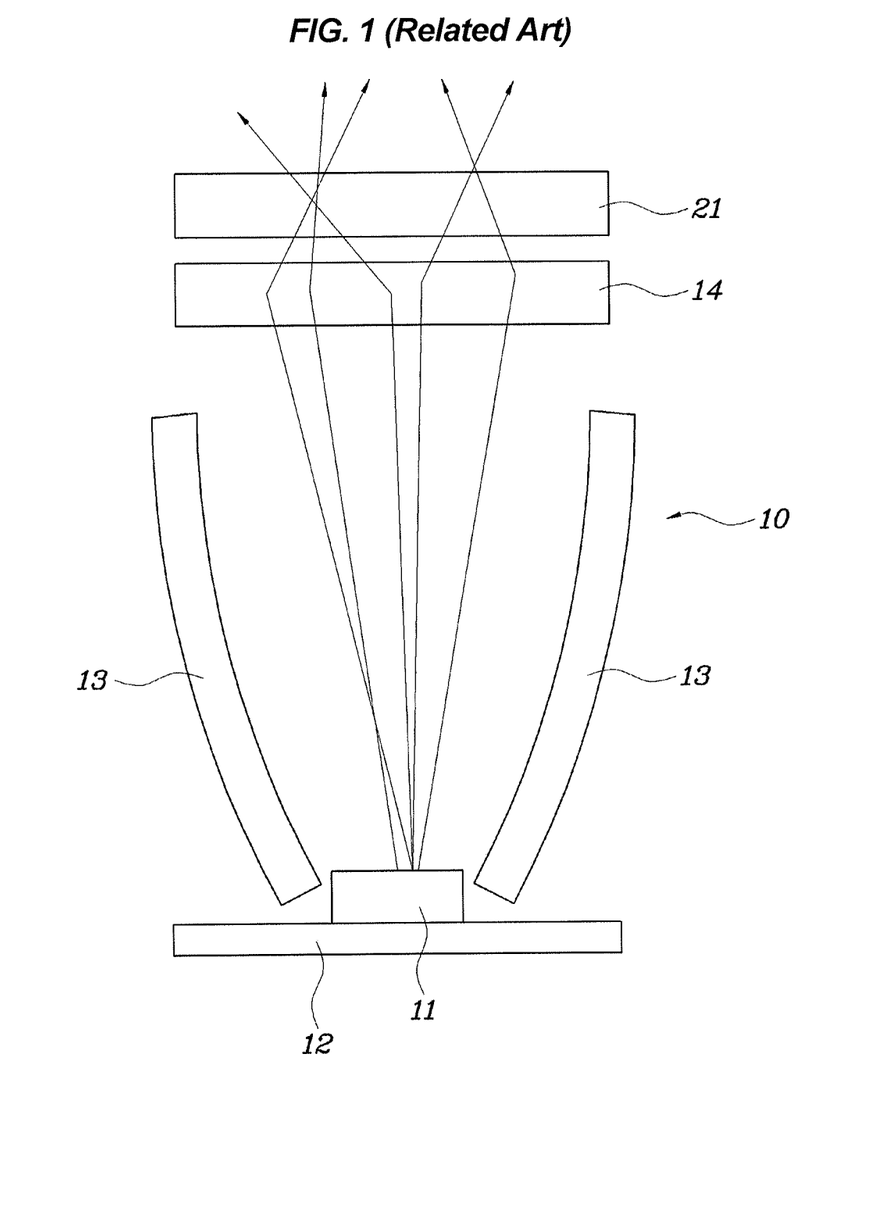
FIG. 1 is a diagram illustrating a light source module of a rear combination lamp for a vehicle according to a related art.

Recently, use of rear combination lamps using a Light Emitting Diode (LED) as a light source, which has longer life span and higher light efficiency than conventional light sources has been on gradual increase. With reference to FIG. 1, a light source module 10 for a conventional rear combination lamp includes an LED light source 11, a Printed Circuit Board (PCB substrate) 12 which controls supply of current to the LED light source 11, a reflecting plate 13 which reflects light emitted from the LED light source 11 toward an outer lens 21, and a light diffusing lens 14 which is installed in front of the reflecting plate 13 to diffuse the light emitted from the LED light source 11.

The conventional light source module 10 has the following problems. First, since the conventional light source module 10 is equipped with the reflecting plate 13 installed in front the LED light source 11, the entire optical system including the LED light source 11 and the outer lens 21 has a large size, leading to low flexibility in design, heavy weight, and increased cost.

Second, since the conventional light source module 10 emits light by converting the light emitted from the LED light source 11 into a simple image such as point, line, and plane, its light is poorly visible. When increasing the number of the LED light sources 11 to improve the poor visibility, the cost greatly increases.

Figure 2:
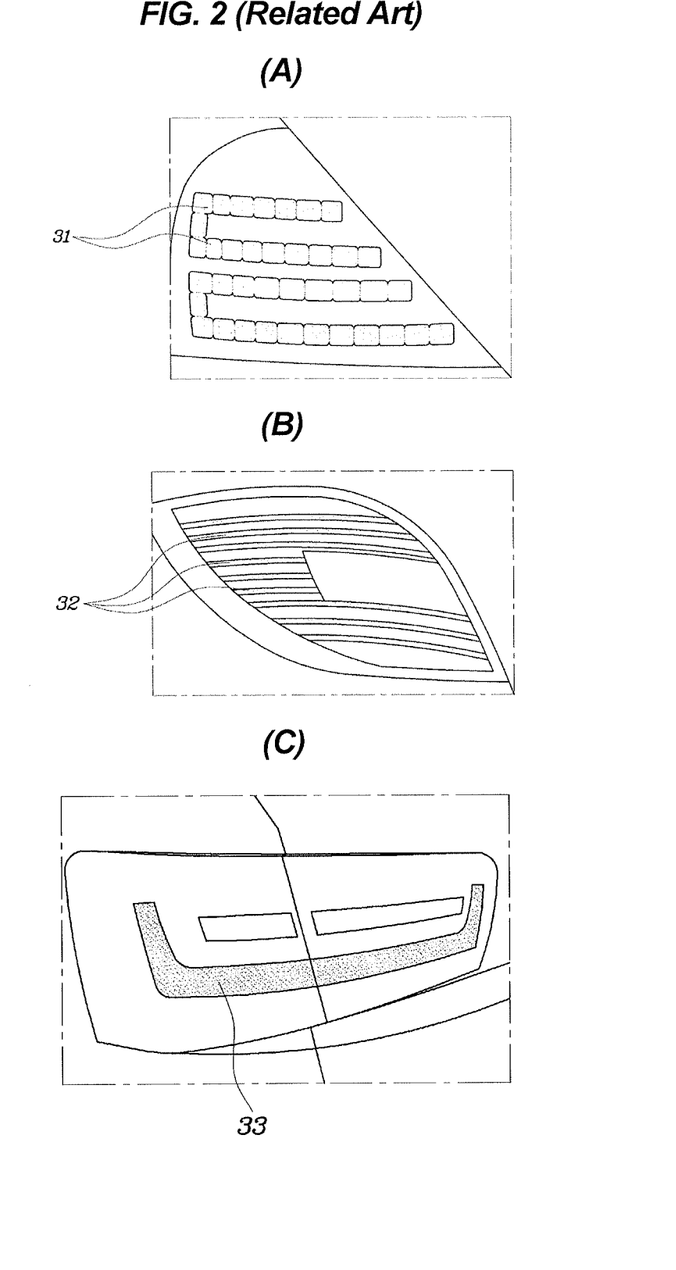
FIGS. 2A to 2C are diagrams illustrating light-emission images formed by the light source module according to the related art.

FIGS. 2A to 2C illustrate light-emitted images formed by the conventional light source module 10. FIG. 2A is a point image 31 with multiple dots, FIG. 2B is a line image 32, and FIG. 3 is a plane image 33.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention are directed to providing a light source module for a vehicle which forms a bezel image using collected light and a hidden effect of a deposited film when a light source is not turned on and forms a stereoscopic light-emission image when the light source is turned on.

Alternatively, various aspects of the present invention are directed to providing a light source module for a vehicle which provides a luxury appearance by forming a bezel image and improves visibility without increasing the number of light sources, i.e., without increasing the cost by forming a stereoscopic light-emission image.

Further alternatively, various aspects of the present invention are directed to providing a light source module for a vehicle which does not may have a reflector in front of a light source, reducing the size of an optical system and weight of a lamp and thereby achieving cost saving.

In an aspect of the present invention, a light source module for a vehicle may include an LED light source, a Printed Circuit Board (PCB) configured to control supply of current to the LED light source, a patterned film disposed on the PCB and provided with an optical pattern which enables a stereoscopic light-emission image of a desired pattern to be formed when light from the LED light source is emitted thereto, and an optical resin disposed on the patterned film, the optical resin uniformly transmitting the light from the LED light source to an entire range of the patterned film.

The light source module may further include a reflective film disposed between the PCB and the patterned film, the reflective film reflecting the light of the LED light source diffused to a back side, back to a front side when the LED light source is turned on and exhibiting a hidden effect of a deposited film when the LED light source is not turned on.

The light source module may further include a protective film disposed on the optical resin, the protective film protecting the optical resin and maintaining a shape of the optical resin.

The stereoscopic image is a linear image or a curved image, and the curved image is formed using a plurality of optical patterns each extending in radial directions from a center of a circle.

A pattern-dividing line is formed in the reflective film, and wherein the pattern-dividing line divides an area of the patterned film into a plurality of divided regions when the LED light source is turned on.

The LED light source is provided for each divided region so that each divided region forms one stereoscopic light-emission image respectively, and each divided region in the patterned film is provided with own optical pattern to form the stereoscopic light-emission image.

The LED light sources are installed near ends of the pattern-dividing line for the divided regions, respectively, and wherein the LED light sources for the divided regions are arranged at regular intervals.

The stereoscopic images formed by each divided region are linear or curved images and each of the curved images is formed using a plurality of optical patterns each extending in radial directions from a center of a circle.

The light source module may further include a light diffusion preventing film that is formed along the pattern-dividing line, the light diffusion preventing film preventing one stereoscopic image formed by one of the divided regions from intruding on an adjacent divided region of the divided regions.

An assembly slit that penetrates through the protective film and is formed along the pattern-dividing line is formed in the optical resin, and wherein the light diffusion preventing film is installed such that a first end takes root in the assembly slit and a second end protrudes from an outer surface of the protective film.

The light diffusion preventing film is a bezel-integrated light diffusion preventing film to form a bezel image using effect of a deposited film when the LED light source is not turned on.

The second end of the light diffusion preventing film which protrudes from the outer surface of the protective film is provided with a shielding portion disposed in front of the LED light source to prevent light from the LED light source from being directly output to a lens installed in front of the LED light source.

The light source module may further include a bezel which is formed along a periphery of the optical resin, and wherein the bezel and the reflective film are used to form a bezel image when the LED light source is not turned on.

The light source module is fixed to a lamp housing using a bracket, and the lamp housing is fixed to a body of the vehicle.

The light source module is formed with a flexible plate which is bendable in a curved shape.

According to an exemplary embodiment of the present invention, it is possible to greatly improve visibility of an LED light source by forming a stereoscopic light-emission image using an optical pattern formed in a patterned film while the LED light source is turned on. In addition, it is possible to make a rear combination lamp of a vehicle look luxurious by forming a bezel image using a reflective film, a bezel-integrated light-guide prevention film, and a bezel in combination with the hidden effect of a deposited film when the LED light source is not turned on.

On the other hand, for a period during which the LED light source is not turned on, it is possible to improve visibility of a lamp and provide the lamp with a luxurious appearance by forming pattern-dividing lines in the reflective film to divide the patterned film into a plurality of divided regions and by performing control such that each divided region forms a stereoscopic light-emission image.

In addition, it is possible to greatly improve light efficiency of a lamp by securing concentration of a larger amount of the light emitted from the LED light source by reflecting the light, emitted from the LED light source and diffused to the back side of the lamp, back to the optical pattern formed in the patterned film using a reflective film.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, preferred embodiments of the present invention will be described in detail with reference to the accompanying drawings.

Figure 3:
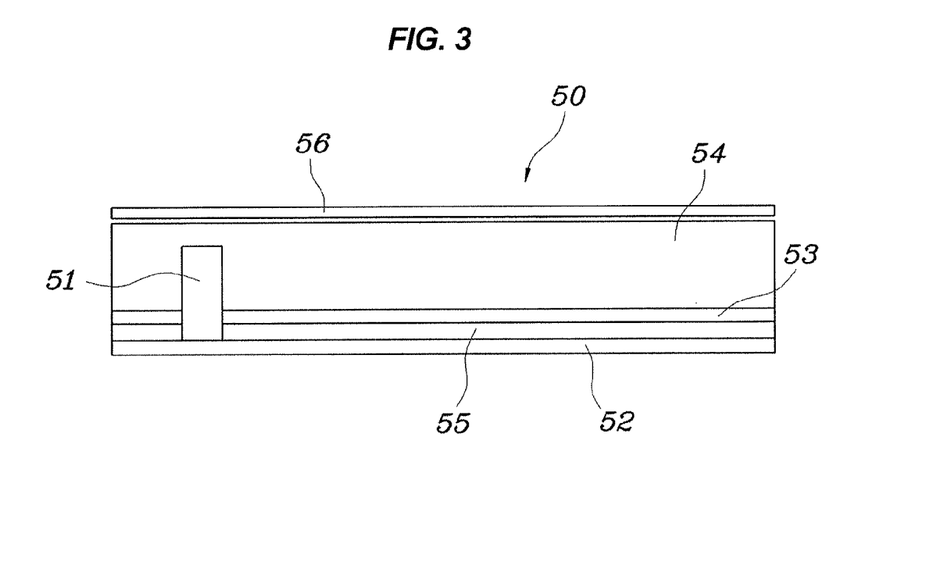
FIG. 3 is a diagram illustrating a light source module of a rear combination lamp according to one embodiment of the present invention.
Figure 4:
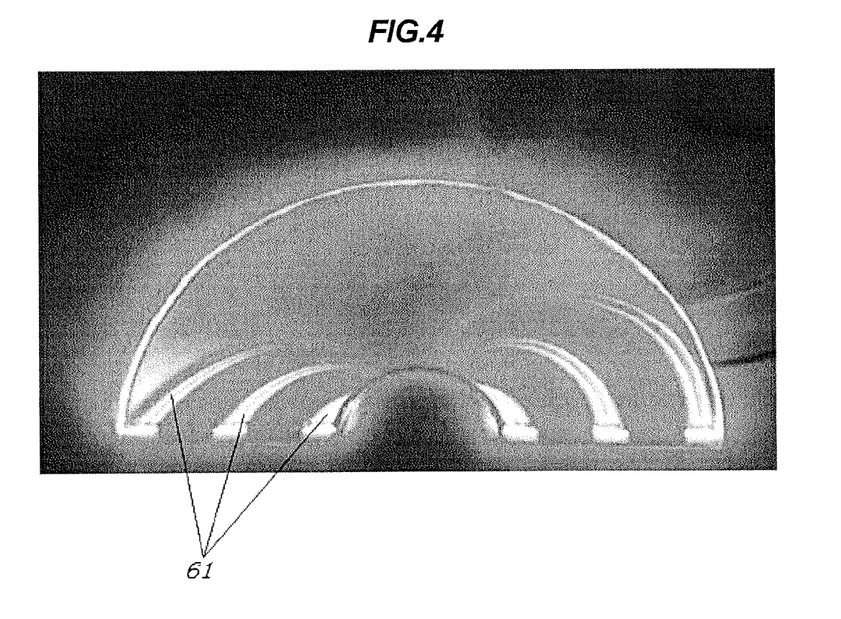
FIG. 4 is a diagram illustrating a light-emission image having a curved shape which is formed by the light source module according to the exemplary embodiment.
Figure 5:
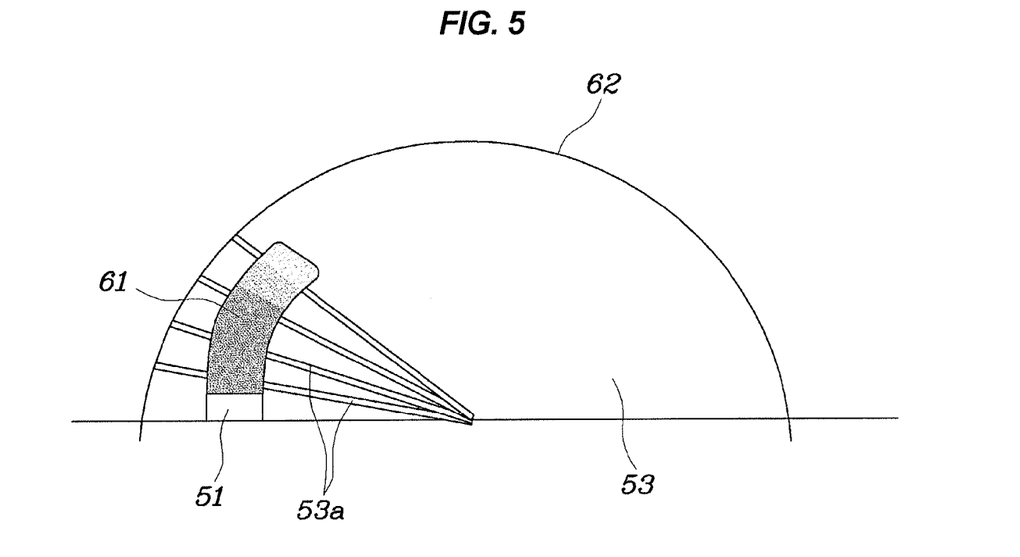
FIG. 5 is a diagram illustrating an optical pattern in a patterned film to form a stereoscopic light-emission image having a curved shape according to the exemplary embodiment.

As illustrated in FIGS. 3 to 5, a rear combination lamp according to one embodiment of the present invention includes an LED light source 51, a PCB substrate 52, a patterned film 53, optical resin 54, a reflective film 55, and a protective film. The PCB substrate 52 controls supply of current to the LED light source 51. The patterned film 53 is stacked on the PCB substrate 52 and has optical patterns 53a to form a stereoscopic light-emission image 61 of a desired pattern using light of the LED light source 51. The optical resin 54 is stacked on the patterned film 53 to uniformly transmit the light from the LED light source 51 to the entire range of the patterned film 53. The reflective film 55 is stacked between the PCB substrate 52 and the patterned film 53. The reflective film 55 reflects the light, which is emitted from the LED light source 51 and diffused to the back side, back to the LED light source 51 when the LED light source 51 is turned on and exhibits a hidden effect of a deposited film when the LED light source 51 is not turned on. The protective film 56 is stacked on the optical resin 54 to protect the optical resin 54 and maintain the shape of the optical resin 54.

A first end of the LED light source 51 is electrically connected to the PCB substrate 52 and a second end thereof faces the front at which a lens is arranged. Particularly, the LED light source 51 is installed at one side of the optical pattern 53a formed in the patterned film 53.

The optical resin 54 is a medium to transfer the light of the LED light source 51 to the patterned film 53. The light from the LED light source 51 is guided to the optical pattern 53a of the patterned film 53 through the optical resin 54, thereby improving light efficiency.

The optical resin 54 is made of polymethyl methacrylate (PMMA) or ultraviolet-ray curable resin but not limitedly.

The reflective film 55 is an aluminum-deposited reflective film which improves reflection efficiency. When the LED light source 51 is turned on, the reflective film 55 reflects the light, emitted from the LED light source 51 and diffused to the back side, back to the front side when the LED light source 51 is turned on. On the contrary, when the LED light source 51 is not turned on, the reflective film 55 makes the light source module look luxurious based on the hidden effect of a deposited film.

Most of the light from the LED optical source 51 is output to the lens disposed at the front side by using the optical pattern 53a of the patterned film 53, ultimately forming a stereoscopic image. Part of the light is not reflected by the optical pattern 53a but is diffused to the back side at which the PCB substrate 52 is arranged. At this time, the reflective film 55 functions to reflect the light from the LED light source 51 back to the LED light source 53 using the optical pattern 53a of the patterned film 53.

That is, since the reflective film 55 reflects the light of the LED light source 51, diffused to the back side at which the PCB substrate 52 is arranged, back to the LED light source 51 using the optical pattern 53a of the patterned film 53, it is possible to greatly reduce light loss attributable to diffused light. That is, it is possible to collect a larger amount of light compared to the structure which does not have a reflective film. This improves the light efficiency of the lamp.

The reflective film 55 makes the lamp look luxurious based on hidden effect of a deposited film when the LED light source 51 is not turned on.

The light source module 50 is flexible to be bent in a curved shape. The protective film 56 protects the optical resin 54 not to be damaged as well as maintains the curved shape of the optical resin 54.

The protective film 56 is made of PET (polyethyleneterephthalate) but not limitedly.

The stereoscopic light-emission image 61 may be a linear shape or a curved shape. The curve-shaped stereoscopic light-emission image 61 is formed using a plurality of optical patterns 53a each extending in radial directions from the center of a circle 62 as illustrated in FIG. 5.

The optical patterns 53a are perpendicular to the direction of light emitted from the LED light source 51. The intensity (luminosity) of the light from the LED light source 51 decreases as the distance to the LED light source 51 increases. For this reason, the light which is reflected by the optical pattern 53a distanced farther from the LED light source 51 looks as when it were further sunk into the vehicle creating an illusion of depth, and thus making the image formed by the light look stereoscopic. That is, the stereoscopic light-emission image 61 of a curved shape that has three-dimensional effect is formed.

Alternatively, as illustrated in FIGS. 6 to 9, pattern-dividing lines 57 may be formed in the reflective film 55 so that the image formed through the patterned film 53 is divided into a plurality of divided regions 53b by the pattern-dividing lines 57 when the LED light source 51 is turned on.

Figure 6:
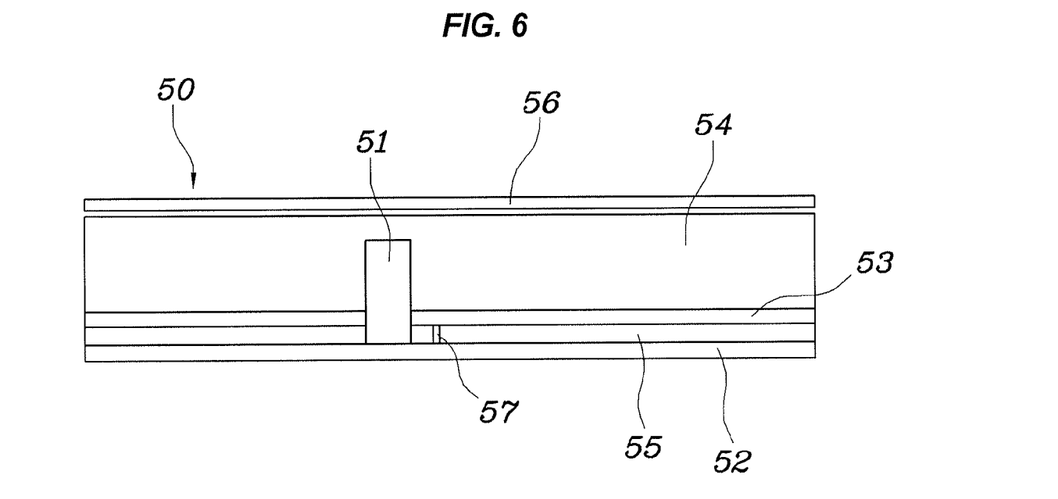
FIGS. 6 to 9 are diagrams describing a patterned film which is divided into a plurality of divided regions in which each divided region displays a stereoscopic light-emission image according to the exemplary embodiment.
Figure 7:
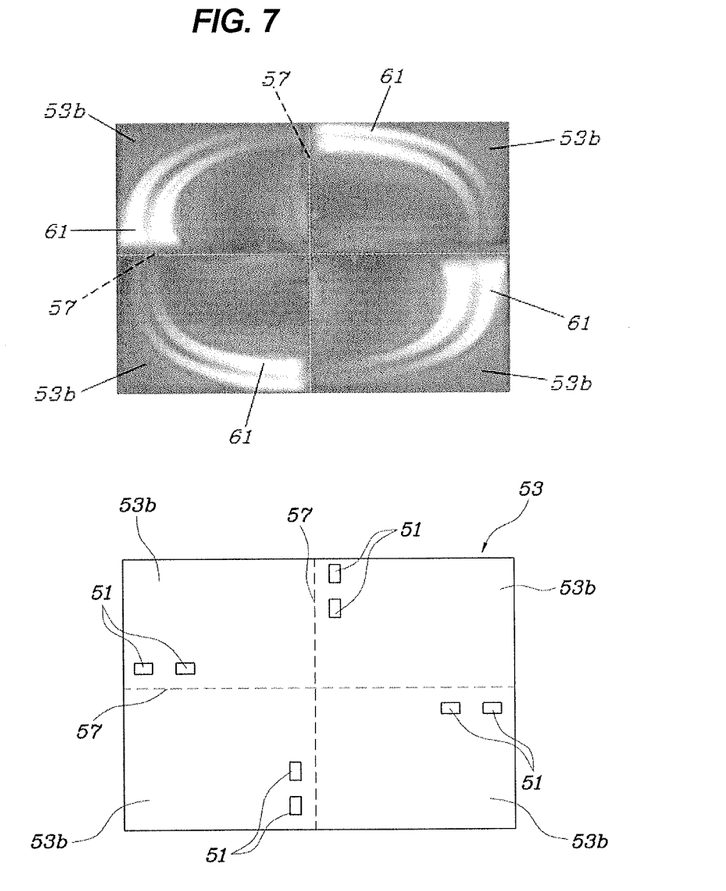

According to the present embodiment, there are two patent dividing lines 57 forming four divided regions 53b, but the number of the patent dividing lines 57 is not limited to two.

Each divided region 53b forms one stereoscopic light-emission image 61. To this end, the LED light source 51 is installed for every divided region 53b, and the optical patterns 53a of the patterned film 53 are formed to correspond to the divided regions 53b, respectively.

In the case where the LED light source 51 is provided for the divided regions 53b, the LED light sources 51 are installed at ends of the pattern-dividing lines 57. Preferably, the LED light sources 51 are installed at regular intervals so that the stereoscopic light-emission images 61 can be stably formed.

Figure 8:
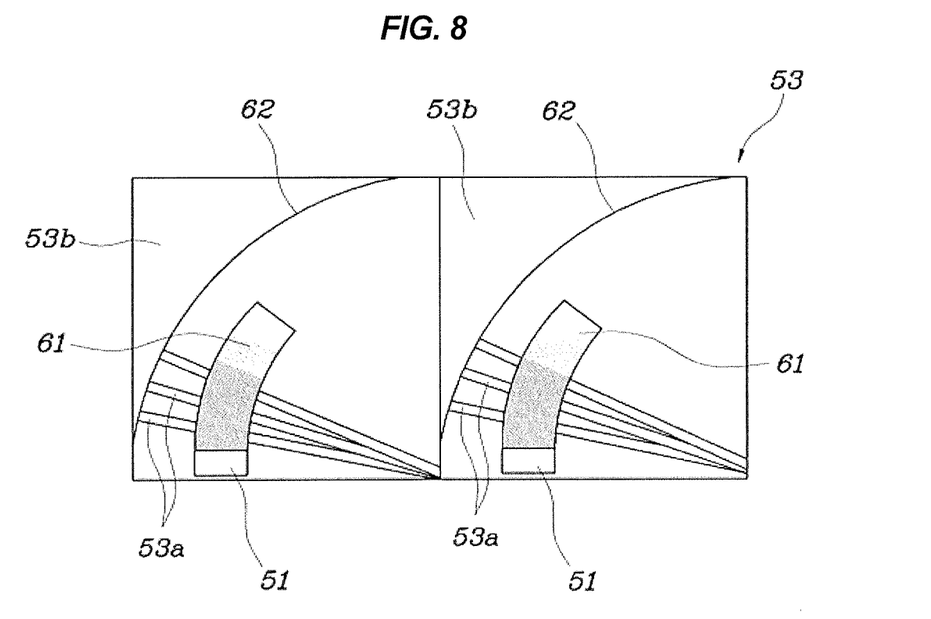
Figure 9:
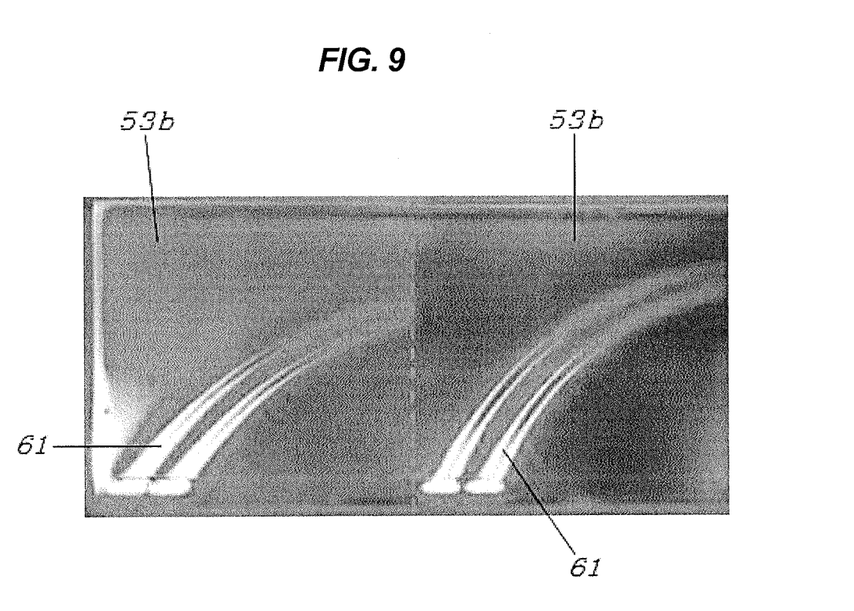

When a plurality of optical patterns 53a are formed to extend in radial directions from the center of the circle 62 for each divided region 53b as illustrated in FIG. 8, each divided region 53b can form the stereoscopic light-emission images 61 of a curved shape.

Figure 10:
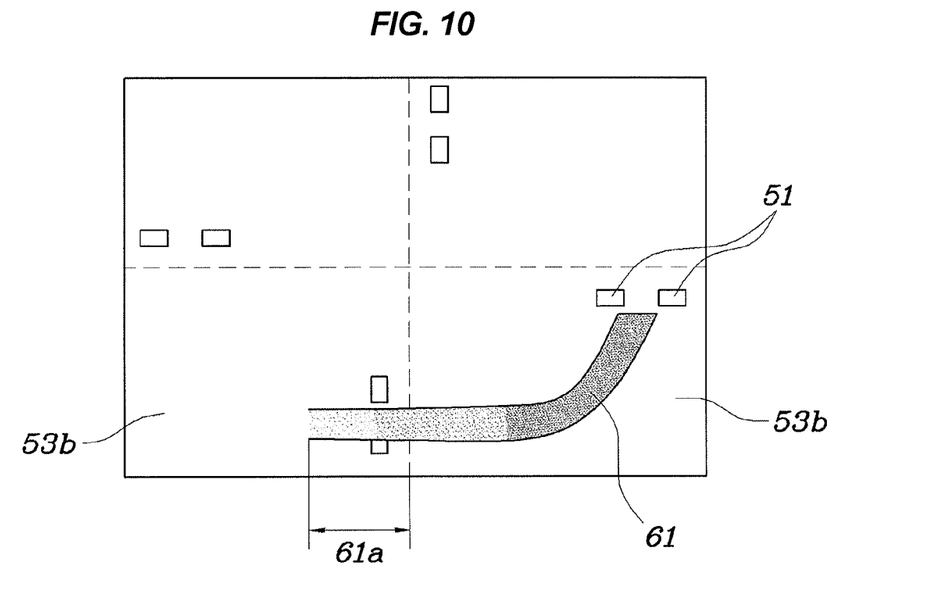
FIGS. 10 to 12 are diagrams illustrating a light-guide prevention film and a bezel according to the exemplary embodiment.

In the case where each divided region 53b forms the stereoscopic light-emission image 61, the stereoscopic light-emission image 61 formed by one divided region 53b is likely to intrude on adjacent divided regions 53b. In this case, the images of the adjacent divided regions 53b may be distorted. As a result, the desired stereoscopic light-emission images 61 cannot be formed.

In FIG. 10, reference numeral 61a indicates a light-diffused image which intruded on the adjacent divided region 53b.

Figure 11:
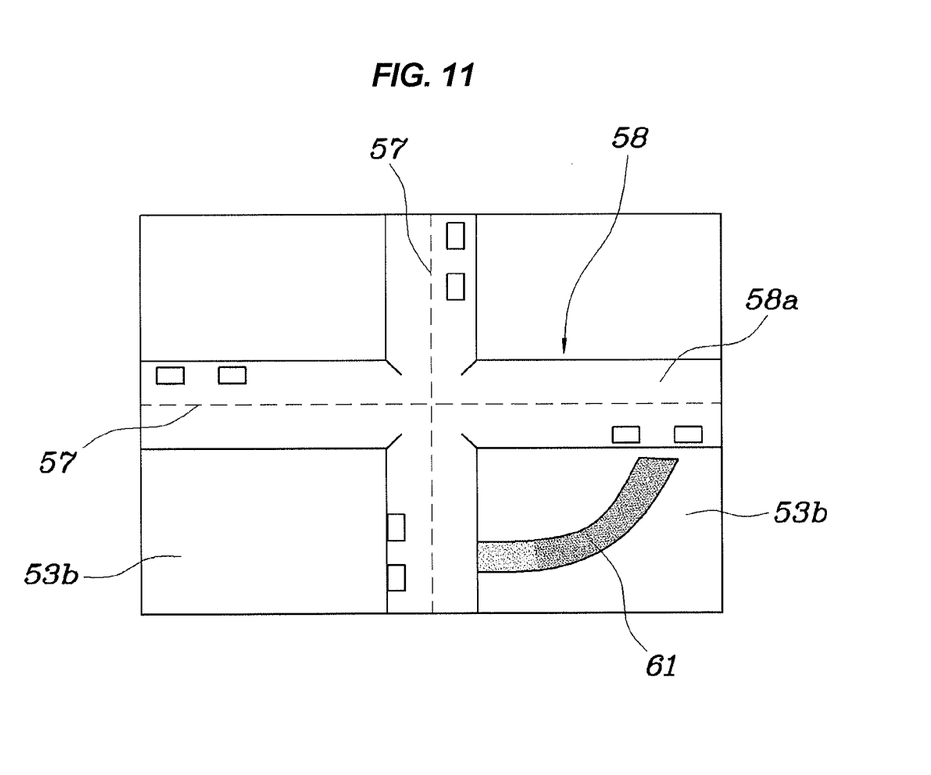
Figure 12:
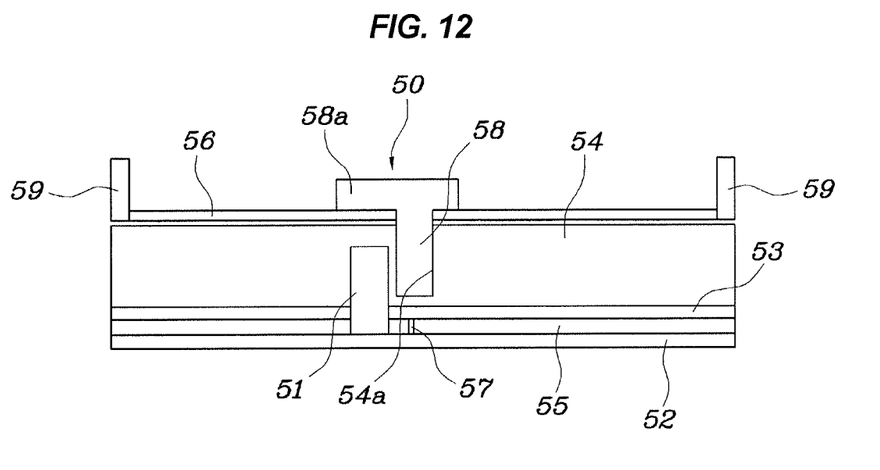

In order to prevent the light-diffused image 61a from being formed, light diffusion preventing films 58 are formed along the pattern-dividing lines 57 as illustrated in FIGS. 11 and 12.

Since the light diffusion preventing films 58 can prevent the light-diffused image 61 from intruding the adjacent divided region 53b, each divided region 53b can form the stereoscopic light-emission image 61 of the desired shape.

Assembly slits 54a penetrating through the protective film 56 from the upper surface to the lower surface are formed along the pattern-dividing lines 57 and in the optical resin 54 in order to install the light diffusion preventing films 58. The light diffusion preventing film 58 is structured such that a first end thereof takes root in the assembly slit 54a and a second protrudes from the outer surface of the protective film 56.

Figure 13:
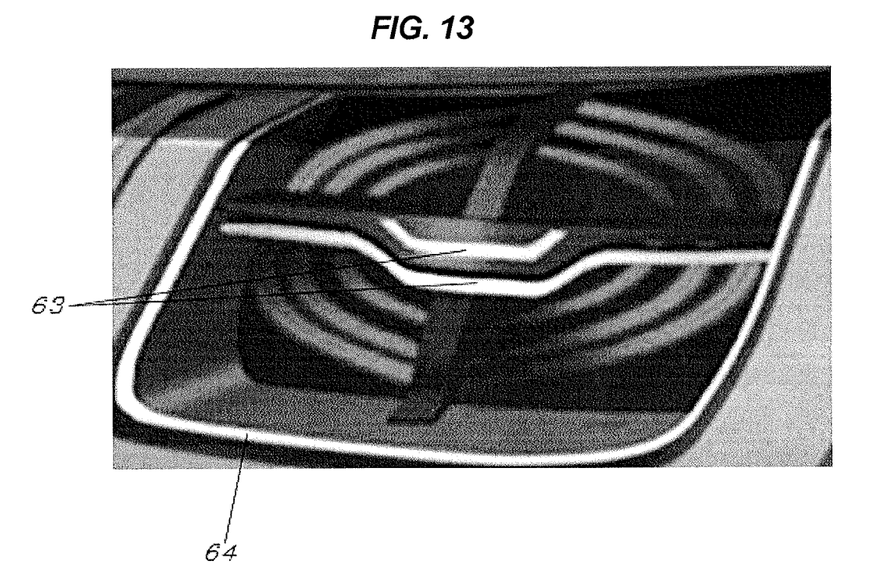
FIG. 13 is a diagram illustrating a bezel image formed by the light source module according to the exemplary embodiment.

The light diffusion preventing film 58 is a bezel-integrated light diffusion preventing film which can form a bezel image 63 using deposition effect at a middle portion of the lamp as illustrated in FIG. 13 even when the LED light source 51 is not turned on.

The bezel image 63 makes the lamp look far more luxurious.

In the light diffusion preventing film 58, the second end which protrudes outward from the protective film 56 is provided with a shielding portion 58a which prevents the light emitted from the LED light source 51 from being directly output to the lens disposed at the front side.

When the light from the LED light source 51 is output to the front side after being reflected by the optical pattern 53a, the stereoscopic light-emission image 61 according to an exemplary embodiment of the present invention is formed. However, when the light from the LED light source 51 is directly output to the lens, the stereoscopic light-emission image is not formed. In order to prevent this event from happening, the shielding portion 58a is arranged in front of the LED light source 51 so that the light cannot be directly output to the lens but be output to the optical pattern 53a.

With reference to FIG. 12, the light source module according to the present embodiment further includes a bezel 59 which is integrated with the periphery of the optical resin 54.

As shown in FIG. 13, the bezel 59 enables the bezel image 64 to be formed along the periphery of the lamp by the action of the reflective film 55 and the deposition effect, making the lamp look far more luxurious.

Figure 14:
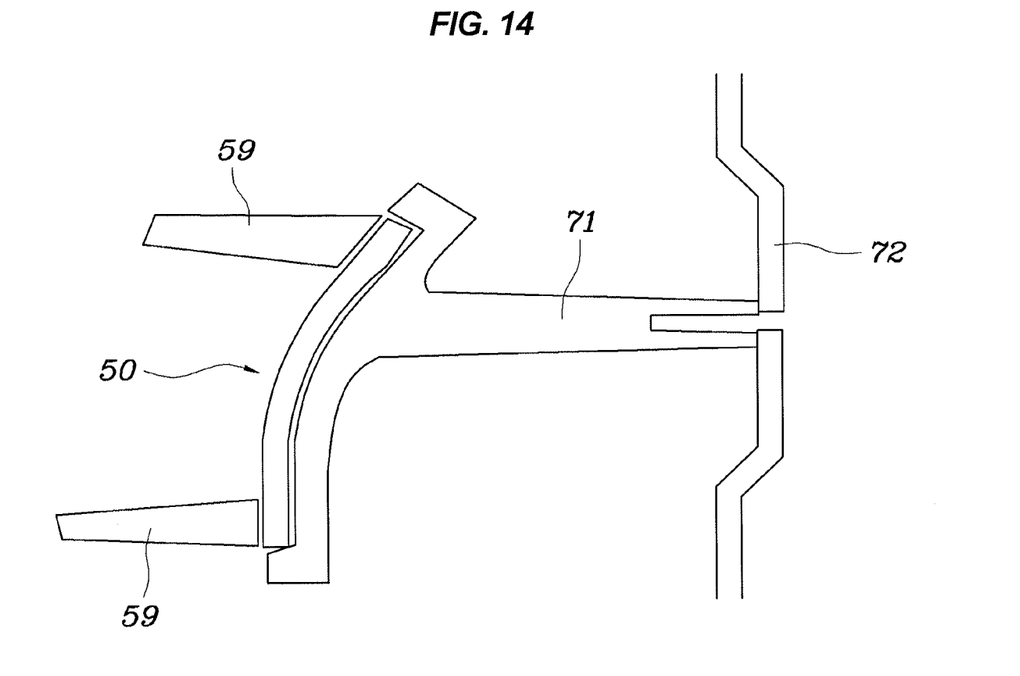
FIG. 14 is a diagram illustrating an installation structure for installing the light source module according to the exemplary embodiment.

As illustrated in FIG. 14, the light source module 50 according to the present embodiment is fixed to a lamp housing 72 using a bracket 71, and the lamp housing 72 is fixed to the body of a vehicle.

As having described, the light source module according to the present embodiment has the advantage of improving visibility of a lamp by displaying the stereoscopic light-emission image 61 of a curved shape using the optical pattern 53a formed in the patterned film 53 when the LED light source 51 is turned on as well as the advantage of making a lamp look far more luxurious by forming the bezel image 63 or 64 based on the hidden effect of a deposited film by using the reflective film 55, the bezel-integrated light diffusion preventing film 58, and the bezel 59 when the LED light source 51 is not turned on.

In addition, according to the present embodiment, as the pattern-dividing lines 57 are formed in the patterned film 55, the area of the patterned film 55 is divided into a plurality of divided regions 53b and each divided region 53b displays its own stereoscopic light-emission image 61 when the LED light source 51 is turned on. This structure improves the visibility and luxurious appearance of a lamp.

In addition, according to the present embodiment, since the reflective film 55 reflects the light of the LED light source 51, which is diffused to the back side, back to the optical film 53a formed in the patterned film 53, the light loss attributable to the diffused light is greatly reduced, resulting in an increase in the light efficiency of a lamp.

In addition, according to the present embodiment, as the reflective film 55 increases the amount of light collected, and the light efficiency, sufficient visibility is obtained with use of a minimum number of LED light sources 51, resulting in reduction in the raw cost.

In addition, as the optical pattern 53a formed in the patterned film 53 reflects the light of the LED light source 51 to the front side, a reflecting plate which is typically installed in front of an LED light source in a conventional lamp is no longer necessary to use. Accordingly, it is possible to greatly reduce the size of the entire optical system which includes a light source and a lens. This results in an increase in flexibility in design, a decrease in weight, and cost saving.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A light source module for a vehicle comprising:
an LED light source;
a Printed Circuit Board (PCB) configured to control supply of current to the LED light source;
a patterned film disposed on the PCB and provided with an optical pattern which enables a stereoscopic light-emission image of a desired pattern to be formed when light from the LED light source is emitted thereto;
an optical resin disposed on the patterned film, the optical resin uniformly transmitting the light from the LED light source to an entire range of the patterned film,
a reflective film disposed between the PCB and the patterned film, the reflective film reflecting the light of the LED light source diffused to a back side, back to a front side when the LED light source is turned on and exhibiting a hidden effect of a deposited film when the LED light source is not turned on;
a protective film disposed on the optical resin, the protective film protecting the optical resin and maintaining a shape of the optical resin,
wherein a pattern-dividing line is formed in the reflective film, and wherein the pattern-dividing line divides an area of the patterned film into a plurality of divided regions when the LED light source is turned on, and
wherein the LED light source is provided for each divided region so that each divided region forms one stereoscopic light-emission image respectively, and each divided region in the patterned film is provided with own optical pattern to form the stereoscopic light-emission image;
a light diffusion preventing film that is formed along the pattern-dividing line, the light diffusion preventing film preventing one stereoscopic image formed by one of the divided regions from intruding on an adjacent divided region of the divided regions,
wherein an assembly slit that penetrates through the protective film and is formed along the pattern-dividing line is formed in the optical resin, and wherein the light diffusion preventing film is installed such that a first end takes root in the assembly slit and a second end protrudes from an outer surface of the protective film.

2. The light source module for the vehicle according to claim 1, wherein the stereoscopic image is a linear image or a curved image, and the curved image is formed using a plurality of optical patterns each extending in radial directions from a center of a circle.

3. The light source module for the vehicle according to claim 1, wherein the LED light sources are installed near ends of the pattern-dividing line for the divided regions, respectively, and wherein the LED light sources for the divided regions are arranged at regular intervals.

4. The light source module for the vehicle according to claim 1, wherein the stereoscopic images formed by each divided region are linear or curved images and each of the curved images is formed using a plurality of optical patterns each extending in radial directions from a center of a circle.

5. The light source module for the vehicle according to claim 1, wherein the light diffusion preventing film is a bezel-integrated light diffusion preventing film to form a bezel image using effect of a deposited film when the LED light source is not turned on.

6. The light source module for the vehicle according to claim 1, wherein the second end of the light diffusion preventing film which protrudes from the outer surface of the protective film is provided with a shielding portion disposed in front of the LED light source to prevent light from the LED light source from being directly output to a lens installed in front of the LED light source.

7. The light source module for the vehicle according to claim 1, further comprising a bezel which is formed along a periphery of the optical resin, and wherein the bezel and the reflective film are used to form a bezel image when the LED light source is not turned on.

8. The light source module for the vehicle according to claim 1, wherein the light source module is fixed to a lamp housing using a bracket, and the lamp housing is fixed to a body of the vehicle.

9. The light source module for the vehicle according to claim 1, wherein the light source module is formed with a flexible plate which is bendable in a curved shape.

* * * * *